UNITED STATES PATENT OFFICE.

WILLIAM E. LYONS, OF NEW HAVEN, CONNECTICUT.

ALTERATIVE TONIC.

SPECIFICATION forming part of Letters Patent No. 412,769, dated October 15, 1889.

Application filed February 26, 1889. Serial No. 301,226. (No specimens.)

*To all whom it may concern:*

Be it known that I, WILLIAM E. LYONS, a citizen of the United States, residing at New Haven, in the county of New Haven and State of Connecticut, have invented a new and useful medicinal liquid composition of matter to be used for the cure and prevention of the following diseases, to wit: calculus, (kidney gravel,) neuralgia, dyspepsia, indigestion, weak lungs, colds, night-sweats, skin diseases of all kinds, and a general blood purifier and appetizer, of which the following is a specification.

My composition consists of the following ingredients combined in the proportions stated and intermingled by process hereinafter described: Pure water, fifteen gallons; alcohol, one gallon; the herb queen of the meadow or *Eupatorium purpureum*, eight pounds; burdock-root or *Lappa officinalis*, two pounds; black-cohosh root or *Cimicifuga racemosa*, one pound; the green tops of heather, (a shrub or species of brush which grows in abundance on the peat or bog land in Ireland,) eight pounds; white granulated sugar, one-half pound. These ingredients are to be mingled as follows: Take the herbs and heather in proportions, as described, and put them in a water-tight vessel, then add one gallon of alcohol and four gallons of cold boiled water, and place the vessel in a warm place, allowing it to stand four days, shaking it well three times each day. At the expiration of said four days draw from the liquid contained in said vessel three gallons, laying it aside to be used as hereinafter described. To the remaining liquid and herbs in said vessel add twelve gallons of pure water and said one-half pound of sugar, and put the whole in a kettle and boil slowly from eight to ten hours, thereby reducing the liquid, by evaporation in said kettle, two gallons. Allow this to stand until sufficiently cool to handle, then draw off the liquid in said kettle, pressing the herbs well in so doing, and filter it to prevent any sediment from collecting. Immediately after this and while warm add the three gallons above mentioned and mix the whole well by agitation and put it in a cool place for at least ten hours before using.

In using the above-described composition the patient should drink half an ounce three times a day before or after each meal.

By the use of this composition in the manner above stated the patient will have speedy relief from the aforesaid diseases, and also will find that it imparts a tone and vigor to the whole system.

What I claim, and desire to secure by Letters Patent of the United States, is—

The herein-described composition of matter to be used as a tonic and alterative, consisting of an infusion in water and alcohol of queen of the meadow, burdock-root, black-cohosh root, green tops of the shrub heather, and white granulated sugar, in proportions as specified.

WILLIAM E. LYONS.

Witnesses:
LIVINGSTON W. CLEAVELAND,
JAMES D. LYONS.